United States Patent
Nishiguchi et al.

(10) Patent No.: US 8,097,665 B2
(45) Date of Patent: Jan. 17, 2012

(54) CATIONIC ELECTRODEPOSITION COATING COMPOSITION

(75) Inventors: Shigeo Nishiguchi, Hiratsuka (JP); Akihiko Shimasaki, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 12/873,580

(22) Filed: Sep. 1, 2010

(65) Prior Publication Data

US 2011/0062026 A1    Mar. 17, 2011

(30) Foreign Application Priority Data

Sep. 15, 2009   (JP) .................. 2009-212862

(51) Int. Cl.
*B32B 15/08* (2006.01)
*C08K 3/10* (2006.01)
*C08K 3/28* (2006.01)
*C08L 63/02* (2006.01)

(52) U.S. Cl. ........ 523/428; 426/418; 523/404; 523/429; 525/524

(58) Field of Classification Search .......... None
See application file for complete search history.

(56) References Cited

U.S. PATENT DOCUMENTS

| 4,698,141 | A  | * | 10/1987 | Anderson et al. | 204/503 |
| 6,375,820 | B1 | * | 4/2002  | Tomizaki et al. | 204/489 |
| 7,560,162 | B2 | * | 7/2009  | Nishiguchi et al. | 428/413 |
| 2010/0270162 | A1 | * | 10/2010 | Nishiguchi et al. | 205/50 |
| 2010/0300885 | A1 | * | 12/2010 | Nishiguchi et al. | 205/50 |

FOREIGN PATENT DOCUMENTS

| JP | 9-241546 | 9/1997 |
| JP | 2000-290542 | 10/2000 |
| JP | 2009-46628 | 3/2009 |

* cited by examiner

*Primary Examiner* — Robert Sellers
(74) *Attorney, Agent, or Firm* — Wenderoth, Lind & Ponack, L.L.P.

(57) ABSTRACT

A cationic electrodeposition coating composition including amino group-containing modified epoxy resin (A), blocked polyisocyanate curing agent (B), metal compound (C), and nitrogen oxide ion (E), wherein metal compound (C) is contained in an amount of 10 to 10,000 ppm calculated as metal, and nitrogen oxide ion (E) is contained in an amount of 50 to 10,000 ppm relative to the mass of the cationic electrodeposition coating composition. A coated article in which an electrodeposition coating film is formed on an untreated steel sheet exhibits excellent corrosion resistance, in particular, excellent hot salt water immersion resistance at 55° C.; and a multilayer coating film formed by a 3-coat 1-bake coating method on the electrodeposition coating film, which is formed on the untreated steel sheet, exhibits excellent corrosion resistance in a combined corrosion cycle test.

6 Claims, No Drawings

CATIONIC ELECTRODEPOSITION COATING COMPOSITION

TECHNICAL FIELD

The present invention relates to a cationic electrodeposition coating composition that exhibits excellent corrosion resistance on untreated steel sheets.

BACKGROUND ART

Because of their excellent throwing power and low environmental impact, cationic electrodeposition coating compositions are widely used for various applications such as undercoating compositions for automobiles etc. Cationic electrodeposition coating compositions that contain lead compounds and/or chromium compounds, e.g., lead chromate, basic lead silicate, strontium chromate, etc. have been suggested.

However, because of problems with environmental pollution, the use of toxic compounds such as lead compounds and chromium compounds is restricted; and a cationic electrodeposition coating composition that uses a non-toxic or low-toxic rust-preventive pigment, and provides excellent anti-corrosion properties without containing harmful compounds has been developed and is now in use.

For example, Patent Literature 1 discloses a cationic electrodeposition coating composition that comprises (A) a cationic amine modified epoxy resin, (B) a blocked polyisocyanate, and (C) a phosphorous acid divalent or trivalent metal salt, the purpose thereof being to improve anti-corrosion properties without containing lead. Patent Literature 2 discloses a zirconium compound-containing cationic electrodeposition coating composition that exhibits excellent anti-corrosion properties without containing lead.

Patent Literatures 1 and 2 disclose that a coating film formed on a surface-treated steel sheet has excellent anti-corrosion properties even without containing toxic substances such as lead compounds, chromium compounds, etc. However, the electrodeposition coating film formed on a surface-untreated steel sheet has insufficient anti-corrosion properties.

Patent Literature 3 discloses a cationic electrodeposition coating composition comprising a cationic amine modified epoxy resin, a blocked polyisocyanate, and a zirconium salt, the purpose thereof being to improve rust preventive properties to the greatest extent possible. Patent Literature 3 teaches that the composition can provide, even without containing harmful compounds such as lead compounds, chromium compounds, etc., an electrodeposition coating film having excellent anti-corrosion properties on a surface-untreated steel sheet.

However, under severely corrosive conditions, the aforementioned electrodeposition coating film formed on the surface-untreated steel sheet exhibits insufficient anti-corrosion properties; in particular, hot salt water immersion resistance under high temperature is insufficient. Further, when a multilayer coating film that is formed by a 3-coat 1-bake coating method on the electrodeposition coating film formed on the untreated steel sheet is subjected to a combined corrosion cycle test, it exhibits insufficient corrosion resistance. Accordingly, further improvement has been desired.

[Citation List]
  [Patent Literature]
  [PTL 1] Japanese Unexamined Patent Publication No. H9-241546
  [PTL 2] Japanese Unexamined Patent Publication No. 2000-290542
  [PTL 3] Japanese Unexamined Patent Publication No. 2009-46628

SUMMARY OF INVENTION

Technical Problem

The object of the present invention is to find a cationic electrodeposition coating composition that can provide an electrodeposition coating film having excellent corrosion resistance on an untreated steel sheet, in particular, an electrodeposition coating film having excellent hot salt water immersion resistance under high temperature; and a multilayer coating film that has excellent corrosion resistance in a combined corrosion cycle test, the multilayer coating film being formed by a 3-coat 1-bake coating method on the electrodeposition coating film formed on the untreated steel sheet.

Solution to Problem

The present inventors have conducted extensive research to achieve the above object, and found that the object can be attained by a cationic electrodeposition coating composition comprising amino group-containing modified epoxy resin (A), blocked polyisocyanate curing agent (B), metal compound (C), and nitrogen oxide ion (E). The present invention was thus accomplished.

Specifically, the present invention provides the following items.

Item 1

A cationic electrodeposition coating composition comprising amino group-containing modified epoxy resin (A), blocked polyisocyanate curing agent (B), metal compound (C), and nitrogen oxide ion (E);
  the cationic electrodeposition coating composition comprising the metal compound (C) in an amount of 10 to 10,000 ppm calculated as metal (on a metal mass basis), and the nitrogen oxide ion (E) in an amount of 50 to 10,000 ppm, relative to the mass of the cationic electrodeposition coating composition,
  the amino group-containing modified epoxy resin (A) being a resin obtainable by reacting modified epoxy resin (A1) having an epoxy equivalent of 500 to 2,500 and amine compound (A2),
  the modified epoxy resin (A1) being obtainable by reacting diepoxy compound (a1), epoxy resin (a2) having an epoxy equivalent of 170 to 500, and bisphenol compound (a3),
  the diepoxy compound (a1) being compound (1) represented by Formula (1) below,

[Chem. 1]

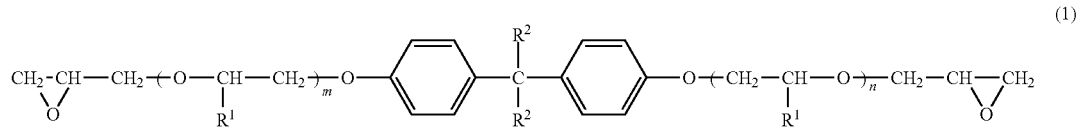

wherein $R^1$ is the same or different, and each represents a hydrogen atom or a $C_{1-6}$ alkyl group; $R^2$ is the same or different, and each represents a hydrogen atom or $C_{1-2}$ alkyl group, and m and n, which represent the number of repeating units of the portion having an alkylene oxide structure, are integers where m+n=1 to 20,
and/or compound (2) represented by Formula (2) below,

[Chem. 2]

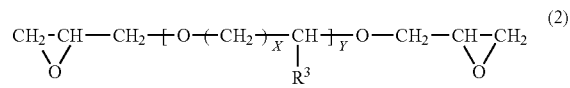

wherein $R^3$ represents a hydrogen atom or $C_{1-6}$ alkyl group, X is an integer of 1 to 9, and Y is an integer of 1 to 50; when Y is 2 or more, each $R^3$ in the repeating unit is the same or different, and the metal compound (C) being a compound of at least one metal (c) selected from the group consisting of zirconium, titanium, cobalt, vanadium, tungsten, molybdenum, copper, indium, zinc, aluminum, bismuth, yttrium, lanthanoid metals, alkali metals, and alkaline earth metals.

Item 2

The cationic electrodeposition coating composition according to Item 1, wherein the metal compound (C) consists of a zirconium compound, or comprises at least one compound selected from the group consisting of zirconium compounds and titanium compounds, and a compound of at least one metal selected from the group consisting of cobalt, vanadium, tungsten, molybdenum, copper, indium, zinc, aluminum, bismuth, yttrium, lanthanoid metals, alkali metals, and alkaline earth metals.

Item 3

The cationic electrodeposition coating composition according to Item 1, wherein the metal compound (C) comprises at least one compound selected from the group consisting of zirconium compounds and titanium compounds, and a compound of at least one metal (c) selected from the group consisting of cobalt, vanadium, tungsten, molybdenum, copper, indium, zinc, aluminum, bismuth, yttrium, lanthanoid metals, alkali metals, and alkaline earth metals.

Item 4

The cationic electrodeposition coating composition according to any one of Items 1 to 3, wherein the solids content of the cationic electrodeposition coating composition is 5 to 40 mass.

Item 5

A coated article obtainable by using the cationic electrodeposition coating composition according to any one of Items 1 to 4 as an electrodeposition coating composition bath, immersing a metal substrate therein, and performing electrodeposition coating.

Advantageous Effects of Invention

According to the cationic electrodeposition coating composition of the present invention, a coated article in which an electrodeposition coating film formed on an untreated steel sheet exhibits excellent corrosion resistance, in particular, excellent hot salt water immersion resistance under hot temperature; and a multilayer coating film formed by a 3-coat 1-bake coating method on the electrodeposition coating film formed on the untreated steel sheet exhibits excellent corrosion resistance in a combined corrosion cycle test, can be obtained without containing toxic metals such as lead compounds, chromium compounds, etc.

There is no particular limitation on the method for producing a coating film using the cationic electrodeposition coating composition, and conventionally known methods can be used. If a two-step method including immersion and electrodeposition is applied, a film (lower layer) mainly comprising inorganic components can be first formed by allowing metal compound (C) to be selectively deposited on the substrate, and then a film (upper layer) mainly comprising organic components can be formed by allowing resin components etc. that comprise amino group-containing modified epoxy resin (A) and blocked polyisocyanate curing agent (B) to be deposited on the film (lower layer).

Thus, the lower layer that contains metal oxide having passivation can be formed on the surface of a metal substrate such as an untreated steel sheet, which contributes to the inhibition of corrosion under the film. Accordingly, a coating film having excellent corrosion resistance and hot salt water immersion resistance under high temperature can be obtained.

Further, even though the cationic electrodeposition coating composition contains metal compound (C) and nitrogen oxide ion (E), diepoxy compound (a1) used in amino group-containing modified epoxy resin (A) can improve bath (liquid) stability, and provide a film with stress relaxation ability. Presumably, for this reason, the multilayer coating film formed by a 3-coat 1-bake coating method on the electrodeposition coating film formed on the untreated steel sheet can exhibit excellent corrosion resistance in a combined corrosion cycle test.

DESCRIPTION OF EMBODIMENTS

The present invention relates to a cationic electrodeposition coating composition that comprises amino group-containing modified epoxy resin (A), blocked polyisocyanate curing agent (B), metal compound (C), and nitrogen oxide ion (E), wherein metal compound (C) is contained in an amount of 10 to 10,000 ppm calculated as metal, and nitrogen oxide ion (E) is contained in an amount of 50 to 10,000 ppm, relative to the mass of the cationic electrodeposition coating composition.

The present invention is detailed below.

Amino Group-Containing Modified Epoxy Resin (A)

Amino group-containing modified epoxy resin (A) for use in the present invention is a resin obtainable by reacting modified epoxy resin (A1) having an epoxy equivalent of 500 to 2,500 with amine compound (A2).

The aforementioned modified epoxy resin (A1) is a resin obtainable by reacting diepoxy compound (a1), i.e., compound (1) represented by Formula (1) and/or compound (2) represented by Formula (2); epoxy resin (a2) having an epoxy equivalent of 170 to 500; and bisphenol compound (a3).

Modified Epoxy Resin (A1) Having an Epoxy Equivalent of 500 to 2,500

The aforementioned modified epoxy resin (A1) is a modified epoxy resin having an epoxy equivalent of 500 to 2,500 that is obtainable by reacting specific diepoxy compound (a1), epoxy resin (a2) having an epoxy equivalent of 170 to 500, and bisphenol compound (a3).

Diepoxy Compound (a1)

As diepoxy compound (a1), compound (1) represented by Formula (1) can be used,

Compound (1)
[Chem. 3]

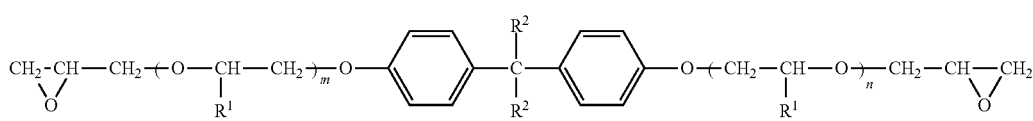

wherein $R^1$ is the same or different, and each represents a hydrogen atom or a $C_{1-6}$ alkyl group; $R^2$ is the same or different, and each represents a hydrogen atom or a $C_{1-2}$ alkyl group; m and n, which represent the number of repeating units of the portion having an alkylene oxide structure, are integers where m+n=1 to 20.

In Formula (1), when at least either m or n represents 2 or more, each $R^1$ in the repeating unit "m", and each $R^1$ in the repeating unit "n" may be the same or different.

Compound (1) can be produced by adding alkylene oxide represented by Formula (3) below,

[Chem. 4]

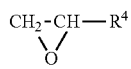
(3)

wherein $R^4$ represents a hydrogen atom or a $C_{1-6}$ alkyl group, to bisphenol A, bisphenol F, etc., to obtain a hydroxyl-terminated polyether compound, and then allowing the polyether compound to react with epihalohydrin to obtain a diepoxy compound.

Examples of alkylene oxide represented by Formula (3) include ethylene oxide, propylene oxide, butylene oxide, hexylene oxide, octylene oxide and like $C_{2-8}$ alkylene oxides.

Of these, ethylene oxide (compound in which $R^4$ in Formula (3) is a hydrogen atom) and propylene oxide (compound in which $R^4$ in Formula (3) is a methyl group) are preferable.

Compound (2)

As diepoxy compound (a1), compound (2) represented by Formula (2) can be used,

[Chem. 5]

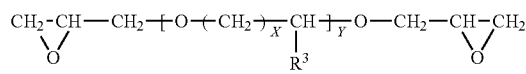
(2)

wherein $R^3$ represents a hydrogen atom or a $C_{1-6}$ alkyl group; X represents 1 to 9; and Y represents an integer of 1 to 50. When Y is 2 or more, each $R^3$ in the repeating unit may be the same or different.

Examples of the method for producing compound (2) include method (1) in which alkylene oxide represented by Formula (2) is subjected to ring-opening polymerization using alkylene glycol as a starting material, thereby obtaining hydroxyl-terminated polyalkylene oxide, and the polyalkylene oxide is allowed to react with epihalohydrin to form a diepoxy compound.

Another example of the method for producing compound (2) is method (2) in which alkylene glycol represented by Formula (4) or polyether diol obtained by condensing two or more alkylene glycol molecules by dehydration, is allowed to react with epihalohydrin to form a diepoxy compound,

[Chem. 6]

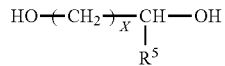
(4)

wherein $R^5$ represents a hydrogen atom or a $C_{1-6}$ alkyl group, and X is an integer of 1 to 9.

Examples of alkylene glycol represented by Formula (4) used herein include ethylene glycol, propylene glycol, trimethylene glycol, 1,4-butanediol, 1,3-butanediol, 1,5-pentanediol, 1,6-hexanediol, 1,8-octanediol, 1,9-nonandiol and like $C_{2-10}$ alkylene glycols.

Examples of diepoxy compound (a1) represented by Formula (1) or Formula (2) include Denacol EX-850, Denacol EX-821, Denacol EX-830, Denacol EX-841, Denacol EX-861, Denacol EX-941, Denacol EX-920, Denacol EX-931 (produced by Nagase ChemteX Corporation); Glyci-ale PP-300P and Glyci-ale BPP-350 (produced by Sanyo Chemical Industries, Ltd.); etc. As diepoxy compound (a1), compounds (1) and (2) may be used in combination.

Epoxy Resin (a2) Having an Epoxy Equivalent of 170 to 500

In the present invention, epoxy resin (a2) having an epoxy equivalent of 170 to 500 (hereinafter sometimes simply referred to as epoxy resin (a2)) for use in the production of modified epoxy resin (A1) having an epoxy equivalent of 500 to 2,500 includes compounds having two or more epoxy groups per molecule, and an epoxy equivalent of 170 to 500, preferably 170 to 400, excluding diepoxy compound (a1), i.e., compound (1) represented by Formula (1) and compound (2) represented by Formula (2). Suitable epoxy resin (a2) has a number average molecular weight of 340 to 1,500, and preferably 340 to 1,000. In particular, epoxy resin (a2), which can be obtained by reacting a polyphenol compound with epihalohydrin, is preferable.

The "number average molecular weight" herein is a value determined according to the method of JIS K 0124-83, from a chromatogram measured by gel permeation chromatograph, based on the molecular weight of standard polystyrene. For a gel permeation chromatograph, "HLC8120GPC" (produced by Tosoh Corporation) was used. The measurement was conducted using four columns, "TSK GEL G-4000HXL", "TSK GEL G-3000HXL", "TSK GEL G-2500HXL", and "TSK GEL G-2000HXL" (trade names; produced by Tosoh Corporation), under the following conditions: mobile phase: tetrahydrofuran, measuring temperature: 40° C., flow rate: 1 ml/min, and detector: $R^1$.

Examples of polyphenol compounds used for forming such epoxy resins include bis(4-hydroxyphenyl)-2,2-propane (bisphenol A), bis(4-hydroxyphenyl)methane (bisphenol F), bis(4-hydroxycyclohexyl)methane (hydrogenated bisphenol F), 2,2-bis(4-hydroxycyclohexyl)propane (hydrogenated bisphenol A), 4,4'-dihydroxybenzophenone, bis(4-hydroxyphenyl)-1,1-ethane, bis(4-hydroxyphenyl)-1,1-isobutane, bis(4-hydroxy-2 or 3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, etc.

Of the epoxy resins obtainable by reacting a polyphenol compound with epichlorohydrin, those of the following Formula (5) derived from bisphenol A are preferable,

[Chem. 7]

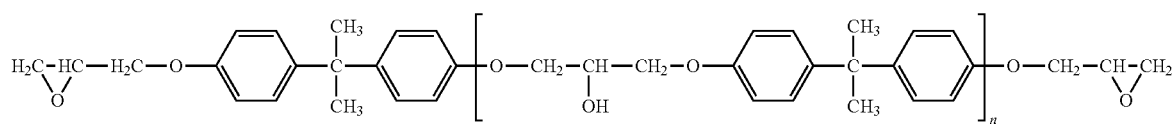

(5)

wherein n is 0 to 2.

Examples of commercial products of such epoxy resins include those available from Japan Epoxy Resins Co., Ltd. under the trade names of jER828EL and jER1001.

Bisphenol Compound (A3)

Examples of bisphenol compound (a3) include those represented by Formula (6) below,

[Chem. 8]

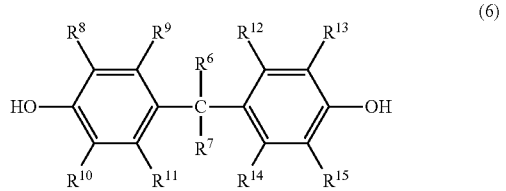

(6)

wherein $R^6$ and $R^7$ each represents a hydrogen atom or a $C_{1-6}$ alkyl group; and $R^8$, $R^9$, $R^{10}$, $R^{11}$, $R^{12}$, $R^{13}$, $R^{14}$, and $R^{15}$ are the same or different, and each represents a hydrogen atom or a $C_{1-6}$ alkyl group.

Specific examples thereof include bis(4-hydroxyphenyl)-2,2-propane (bisphenol A), bis(4-hydroxyphenyl)methane (bisphenol F), etc.

In general, modified epoxy resin (A1) having an epoxy equivalent of 500 to 2,500 can be produced by mixing diepoxy compound (a1), epoxy resin (a2) having an epoxy equivalent of 170 to 500, and bisphenol compound (a3), and reacting these three compounds in the presence of a suitably selected reaction catalyst such as dimethylbenzylamine, tributylamine, or like tertiary amines; tetraethylammonium bromide, tetrabutylammonium bromide or like quaternary ammonium salts, at a reaction temperature of about 80° C. to 200° C., and preferably about 90° C. to 180° C., for 1 to 6 hours, and preferably 1 to 5 hours.

Examples of methods for producing modified epoxy resin (A1) are as follows (Methods 1 to 3).

1. A method in which diepoxy compound (a1), epoxy resin (a2) having an epoxy equivalent of 170 to 500, and bisphenol compound (a3) are all mixed and reacted with each other to produce modified epoxy resin (A1) having an epoxy equivalent of 500 to 2,500.
2. A method in which diepoxy compound (a1) and bisphenol compound (a3) are reacted to yield a reaction mixture, after which epoxy resin (a2) having an epoxy equivalent of 170 to 500 is added and reacted with the reaction mixture to produce modified epoxy resin (A1) having an epoxy equivalent of 500 to 2,500.
3. A method in which epoxy resin (a2) having an epoxy equivalent of 170 to 500 is reacted with bisphenol compound (a3) to yield a reaction mixture, after which diepoxy compound (a1) is added and reacted with the reaction mixture to produce modified epoxy resin (A1) having an epoxy equivalent of 500 to 2,500. The reaction state can be traced by epoxy value.

In the production of modified epoxy resin (A1), the proportion of diepoxy compound (a1) is preferably 1 to 35 mass, and more preferably 2 to 30 mass, based on the total solids mass of the components for forming modified epoxy resin (A1), i.e., diepoxy compound (a1), epoxy resin (a2) having an epoxy equivalent of 170 to 500, and bisphenol compound (a3). The proportion in the above range is preferable to attain excellent water dispersibility of amino group-containing modified epoxy resin (A) and excellent bath (liquid) stability even when the cationic electrodeposition coating composition includes metal compound (C) and nitrogen oxide ion (E), and to improve anti-corrosion properties on an untreated steel sheet, particularly anti-corrosion properties on an untreated steel sheet even when the formed coating film is a thin film having a thickness of 15 μm or less (when dried).

Further, to provide a coating film having excellent anti-corrosion properties on an untreated steel sheet particularly when the formed coating film has a thickness of 15 µm or less (when dried), it is preferable that the proportion of epoxy resin (a2) having an epoxy equivalent of 170 to 500 be 10 to 80 mass %, particularly 15 to 75 mass %, and the proportion of bisphenol compound (a3) be 10 to 60 mass %, particularly 15 to 50 mass %.

In the above production, an organic solvent may be optionally used. Examples thereof include toluene, xylene, cyclohexane, n-hexane and like hydrocarbon-based solvents; methyl acetate, ethyl acetate, butyl acetate and like ester-based solvents; acetone, methyl ethyl ketone, methyl isobutyl ketone, methyl amyl ketone and like ketone-based solvents; dimethyl formamide, dimethyl acetamide and like amide-based solvents; methanol, ethanol, n-propanol, isopropanol and like alcohol-based solvents; phenylcarbinol, methylphenylcarbinol and like aromatic alkyl alcohol-based solvents; ethylene glycol monobutyl ether, diethylene glycol monoethyl ether and like ether alcohol-based solvents; and mixtures thereof, etc.

Amine compound (A2)

Amino group-containing modified epoxy resin (A) can be obtained by subjecting modified epoxy resin (A1) to an addition reaction with amine compound (A2). Examples of amine compound (A2) include mono- or dialkylamines such as monomethylamine, dimethylamine, monoethylamine, diethylamine, monoisopropylamine, diisopropylamine, monobutylamine, dibutylamine, etc.; alkanolamines such as monoethanolamine, diethanolamine, mono(2-hydroxypropyl)amine, di(2-hydroxypropyl)amine, monomethylaminoethanol, monoethylaminoethanol, monoethylaminobutanol, etc.; alkylene polyamines such as ethylenediamine, propylenediamine, butylenediamine, hexamethylenediamine, tetraethylenepentamine, pentaethylenehexamine, diethylaminopropylamine, diethylenetriamine, triethylenetetramine, and ketiminized compounds of these polyamines, etc.; alkyleneimines such as ethyleneimine, propyleneimine, etc.; cyclic amines such as piperazine, morpholine, pyrazine, etc. Among the above-mentioned amines, it is also possible to use as amine compound (A2), ketiminized amines obtained by ketiminizing primary amines (for example, ketimine of diethylenetriamine with methyl isobutyl ketone, etc.). Amines obtained by ketiminizing primary amines can be used in combination with the amines listed above.

The proportion of each component used in the addition reaction of modified epoxy resin (A1) and amine compound (A2) is not strictly limited, and can be suitably determined according to the use etc., of the cationic electrodeposition coating composition. The proportion of modified epoxy resin (A1) is 70 to 98 mass %, preferably 75 to 96 mass %, and the proportion of amine compound (A2) is 2 to 30 mass %, preferably 4 to 25 mass %, based on the total solids mass of modified epoxy resin (A1) and amine compound (A2) used in the production of amino group-containing modified epoxy resin (A).

The addition reaction is usually carried out in a suitable solvent at 80° C. to 170° C., and preferably 90° C. to 150° C. for 1 to 6 hours, and preferably 1 to 5 hours. Examples of the solvent used in the above reaction include hydrocarbon-based solvents such as toluene, xylene, cyclohexane, n-hexane, etc.; ester-based solvents such as methyl acetate, ethyl acetate, butyl acetate, etc.; ketone-based solvents such as acetone, methyl ethyl ketone, methyl isobutyl ketone, methyl amyl ketone, etc.; amide-based solvents such as dimethylformamide, dimethylacetamide, etc.; alcohol-based solvents such as methanol, ethanol, n-propanol, iso-propanol, etc.; aromatic alkyl alcohol-based solvents such as phenyl carbinol, methyl phenyl carbinol, etc.; ether alcohol-based solvents such as ethylene glycol monobutyl ether, diethylene glycol monoethyl ether, etc.; and mixtures thereof, etc.

Blocked Polyisocyanate Curing Agent (B)

The combination use of amino group-containing modified epoxy resin (A) with blocked polyisocyanate curing agent (B) can make the cationic electrodeposition coating composition of the present invention a heat-curable cationic electrodeposition coating composition.

Blocked polyisocyanate curing agent (B) is an addition-reaction product in almost stoichiometric amount of a polyisocyanate compound and an isocyanate blocking agent. Polyisocyanate compounds usable in blocked polyisocyanate curing agent (B) may be known compounds. Examples thereof include aromatic, aliphatic or alicyclic polyisocyanate compounds such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI (polymethylene polyphenyl isocyanate), bis(isocyanatemethyl)cyclohexane, tetramethylene diisocyanate, hexamethylene diisocyanate, methylene diisocyanate, isophorone diisocyanate, etc.; cyclopolymers or biurets of these polyisocyanate compounds; and combinations thereof.

Specifically, tolylene diisocyanate, xylylene diisocyanate, phenylene diisocyanate, diphenylmethane-2,4'-diisocyanate, diphenylmethane-4,4'-diisocyanate, crude MDI, and like aromatic polyisocyanate compounds are particularly preferable in view of anti-corrosion properties.

The isocyanate blocking agent is added to isocyanate groups of a polyisocyanate compound to block the isocyanate groups. The blocked polyisocyanate compound obtained by such an addition is stable at room temperature; however, it is desirable that the blocking agent be dissociated to regenerate free isocyanate groups, when heated to the baking temperature of a coating film (usually about 100° C. to about 200° C.).

Examples of blocking agents used in blocked polyisocyanate curing agent (B) include methylethylketoxime, cyclohexanone oxime and like oxime-based compounds; phenol, para-t-butylphenol, cresol and like phenol-based compounds; n-butanol, 2-ethylhexanol and like aliphatic alcohol-based compounds; phenylcarbinol, methylphenylcarbinol and like aromatic alkyl alcohol-based compounds; ethylene glycol monobutyl ether, diethylene glycol monoethyl ether and like ether alcohol-based compounds; ε-caprolactam, γ-butyrolactam and like lactam-based compounds; etc.

Metal Compound (C)

The cationic electrodeposition coating composition of the present invention comprises metal compound (C). Metal compound (C) is a compound of at least one metal (c) selected from the group consisting of zirconium, titanium, cobalt, vanadium, tungsten, molybdenum, copper, indium, zinc, aluminum, bismuth, yttrium, lanthanide metals, alkali metals, and alkali earth metals. Of metal compounds (C), water-soluble metal compounds are preferable.

Among metal compounds (C), the use of metal nitrate makes it possible to include both metal (c) and nitrogen oxide ion (E) in the cationic electrodeposition coating composition. However, when a non-metal nitrate version of metal compound (C) is used, nitrogen oxide ion must be added separately to the coating composition.

Examples of zirconium compounds include zirconium chloride, zirconyl chloride, zirconium sulfate, zirconyl sulfate, zirconium nitrate, zirconyl nitrate, zirconium hydrofluoric acid, zirconium hydrofluoric acid salts, zirconium oxide, zirconyl bromide, zirconyl acetate, zirconyl carbonate, zirconium fluoride, etc.

Examples of titanium compounds include titanium chloride, titanium sulfate, titanyl sulfate, titanium nitrate, titanyl nitrate, titanium hydrofluoric acid, titanium hydrofluoric acid salts, titanium oxide, titanium fluoride, etc.

Examples of cobalt compounds include cobalt chloride, cobalt bromide, cobalt iodide, cobalt nitrate, cobalt sulfate, cobalt acetate, ammonium cobalt sulfate, etc. Of these, cobalt nitrate is particularly preferred.

Examples of vanadium compounds include lithium orthovanadate, sodium orthovanadate, lithium metavanadate, potassium metavanadate, sodium metavanadate, ammonium metavanadate, sodium pyrovanadate, vanadyl chloride, vanadyl sulfate, etc.

Examples of tungsten compounds include lithium tungstate, sodium tungstate, potassium tungstate, ammonium tungstate, sodium metatungstate, sodium paratungstate, ammonium pentatungstate, ammonium heptatungstate, sodium phosphotungstate, barium borotungstate, etc.

Examples of molybdenum compounds include lithium molybdate, sodium molybdate, potassium molybdate, ammonium heptamolybdate, calcium molybdate, magnesium molybdate, strontium molybdate, barium molybdate, phosphomolybdate, sodium phosphomolybdate, zinc phosphomolybdate, etc.

Examples of copper compounds include copper sulfate, copper(II) nitrate trihydrate, copper(II) ammonium sulfate hexahydrate, copper (II) oxide, copper phosphate, etc.

Examples of indium compounds include ammonium indium nitrate etc.

Examples of zinc compounds include zinc acetate, zinc lactate, zinc oxide, zinc nitrate, etc.

Examples of aluminum compounds include aluminum nitrate etc.

Examples of bismuth compounds include inorganic bismuth-containing compounds such as bismuth chloride, bismuth oxychloride, bismuth bromide, bismuth silicate, bismuth hydroxide, bismuth trioxide, bismuth nitrate, bismuth nitrite, bismuth oxycarbonate, etc.; and bismuth lactate, triphenylbismuth, bismuth gallate, bismuth benzoate, bismuth citrate, bismuth methoxyacetate, bismuth acetate, bismuth formate, bismuth 2,2-dimethylolpropionate, etc.

Examples of yttrium compounds include yttrium nitrate, yttrium formate, yttrium acetate, yttrium chloride, yttrium sulfamate, yttrium lactate, yttrium hypophosphite, etc.

Examples of lanthanoid metal compounds include lanthanum compounds such as lanthanum nitrate, lanthanum fluoride, lanthanum acetate, lanthanum boride, lanthanum phosphate, and lanthanum carbonate; cerium compounds such as cerium nitrate, cerium chloride, cerium acetate, cerium formate, cerium lactate, cerium oxalate, cerium ammonium nitrate, cerium sulfamate, diammonium cerium nitrate, and cerium hypophosphite; praseodymium compounds such as praseodymium nitrate, praseodymium sulfate, praseodymium formate, praseodymium acetate, praseodymium sulfamate, praseodymium oxalate, and praseodymium hypophosphate; neodymium compounds such as neodymium nitrate, neodymium formate, neodymium acetate, neodymium lactate, neodymium sulfamate, neodymium oxide, and neodymium hypophosphite; samarium compounds such as samarium acetate, samarium formate, and samarium sulfamate; etc.

Examples of compounds of alkali metals (at least one metal selected from the group consisting of lithium, sodium, potassium, rubidium, cesium, and francium) include lithium tungstate, sodium tungstate, potassium tungstate, etc.

Examples of compounds of alkaline earth metals (at least one metal selected from the group consisting of beryllium, magnesium, calcium, strontium, barium, and radium) include calcium molybdate, magnesium molybdate, strontium molybdate, barium molybdate, etc.

In a preferable embodiment, the following are usable as metal compound (C), which is contained in the cationic electrodeposition coating composition of the present invention:

(1): A compound of at least one metal selected from the group consisting of zirconium, titanium, cobalt, vanadium, tungsten, molybdenum, copper, indium, zinc, aluminum, bismuth, yttrium, lanthanide metals, alkali metals, and alkali earth metals.

(2): A compound consisting of a zirconium compound, or a combination of a zirconium compound and a compound of at least one metal (c) selected from the group consisting of titanium, cobalt, vanadium, tungsten, molybdenum, copper, indium, zinc, aluminum, bismuth, yttrium, lanthanide metals, alkali metals, and alkali earth metals.

(3): A compound consisting of a combination of at least one compound selected from zirconium compounds and titanium compounds, and a compound of at least one metal selected from the group consisting of cobalt, vanadium, tungsten, molybdenum, copper, indium, zinc, aluminum, bismuth, yttrium, lanthanide metals, alkali metals, and alkali earth metals.

To improve anti-corrosion properties on the untreated steel sheet, the amount of metal compound (C) used in the present invention is 10 to 10,000 ppm, preferably 150 to 8,000 ppm, more preferably 250 to 5,000 ppm, calculated as metal, relative to the mass of the cationic electrodeposition coating composition.

Adding metal compound (C) so that the mass of metal is within the above-mentioned range is preferable because the corrosion resistance, in particular, the hot salt water immersion resistance under hot temperature of the electrodeposition coating film formed on the untreated steel sheet can be improved; and the corrosion resistance (obtained in a combined corrosion cycle test) of a multilayer coating film formed by a 3-coat 1-bake coating method on the electrodeposition coating film can be Improved without severely impairing coating composition stability. If metal nitrate is used as metal compound (C), examples of the cationic electrodeposition coating composition of the present invention include those in which metal compound (C) is added to a solvent etc. as well as those in which metal (c) and nitrogen oxide ion (E) are added to a solvent etc.

Nitrogen Oxide Ion (E)

The cationic electrodeposition coating composition of the present invention comprises nitrogen oxide ion (E). Nitrogen oxide ion (E) is a general term for nitrate ion, nitrite ion, etc. Examples of the cationic electrodeposition coating composition of the present invention include those in which a nitrogen oxide ion is added to a solvent etc., as well as those including a nitrogen oxide ion. Examples of compounds that generate or contain a nitrogen oxide ion include nitric acid, metal nitrate, metal nitrite, etc.

Examples of nitric acid, metal nitrate, and metal nitrite include nitric acid, nitrous acid, zinc nitrate, aluminum nitrate, ytterbium nitrate, yttrium nitrate, indium nitrate, Nitric acid chloridation molybdenum, potassium nitrate, calcium nitrate, silver nitrate, cobalt nitrate, zirconium nitrate, zirconyl nitrate, strontium nitrate, cesium nitrate, cerium nitrate, titanyl nitrate, titanium nitrate, iron nitrate, copper nitrate, samarium nitrate, neodium nitrate, praseodymium nitrate, ruthenium nitrate, lanthanum nitrate, bismuth nitrate, magnesium nitrate, zinc nitrite, potassium nitrite, calcium nitrite, cerium nitrite, cupric nitrite, copper nitrite, barium nitrite, nickel nitrite, magnesium nitrite, etc.

The cationic electrodeposition coating composition can include nitrogen oxide ion (E) by adding at least one member selected from the nitric acids, metal nitrates, and metal nitrites listed above to the cationic electrodeposition coating composition. The amount of nitrogen oxide ion (E) in the bath of the cationic electrodeposition coating composition of the present invention is 50 to 10,000 ppm, preferably 100 to 8,000 ppm, relative to the mass of the cationic electrodeposition coating composition (bath).

Adjusting the amount of nitrogen oxide ion (E) to the above range is preferable because the deposition of metal compound (C) on the interface (substrate side) between the substrate and the film can be accelerated without impairing coating composition stability. This improves the corrosion resistance of the electrodeposition coating film formed on the untreated steel sheet, in particular, hot salt water immersion resistance under hot temperature, and the corrosion resistance in a combined corrosion cycle test of the multilayer coating film, which is formed by a 3-coat 1-bake coating method on the electrodeposition coating film formed on the untreated steel sheet.

The cationic electrodeposition coating composition of the present invention comprises, if necessary, other additives, such as pigments, catalysts, organic solvents, pigment dispersants, surface control agents, surfactants, etc., in amounts generally used in the field of coating compositions. Examples of the pigments and catalysts include coloring pigments such as titanium white, carbon black, etc.; extender pigments such as clay, talc, baryta, etc.; rust-preventive pigments such as aluminum dihydrogen tripolyphosphate, aluminum phosphomolybdate, etc.; bismuth compounds such as bismuth oxide, bismuth hydroxide, bismuth lactate, etc.; organic tin compounds such as dibutyltin oxide, dioctyltin oxide, etc.; tin compounds such as aliphatic or aromatic carboxylates of dialkyltin, for example, dibutyltin dilaurete, dioctyltin dilaurete, dibutyltin diacetate, dioctyltin dibenzoate, dibutyl tin dibenzoate, etc.

The cationic electrodeposition coating composition of the present invention can be produced by the following methods (1) to (3).

Method (1): Amino group-containing modified epoxy resin (A), blocked polyisocyanate curing agent (B), and, if necessary, other additives are added and fully mixed to form a dissolution varnish. A neutralizer selected from the group consisting of formic acid, acetic acid, lactic acid, propionic acid, citric acid, malic acid, sulfamic acid, mixtures of two or more of these acids, etc. is added to the dissolution varnish, and dispersed in an aqueous medium, thereby obtaining an emulsion. Metal compound (C) and nitrogen oxide ion (E) are then added to the emulsion, followed by further addition of pigment dispersion paste.

Method (2): Metal compound (C) and nitrogen oxide ion (E) are mixed. A pigment ingredient, catalyst, other additives, water, etc. are added and dispersed in the mixture, thereby forming a pigment dispersion paste. The pigment dispersion paste is added to an emulsion containing amino group-containing modified epoxy resin (A), and blocked polyisocyanate curing agent (B).

Method (3): Metal compound (C) and nitrogen oxide ion (E) are added to the bath of the previously prepared cationic electrodeposition coating composition (containing amino group-containing modified epoxy resin (A), and blocked polyisocyanate curing agent (B)), and diluted with water.

The cationic electrodeposition coating composition can be formed by the aforementioned methods (1) to (3), and like equivalent methods.

The cationic electrodeposition coating composition can be produced by adjusting the emulsion and pigment dispersion paste with deionized water etc., so that the solids content of bath paint is 5 to 40 mass %, preferably 8 to 25 mass %, and the pH is 1.0 to 9.0, preferably 3.0 to 6.5.

There is no particular limitation on the method for producing a coating film using the cationic electrodeposition coating composition of the present invention, and any known methods can be used. For example, a coating film can be formed by applying a current to a substrate immediately after immersing the substrate in the bath of the cationic electrodeposition coating composition (referred to as a "one-step method"); or by immersing a substrate in the bath of the cationic electrodeposition coating composition for a certain period of time, or performing electrocrystallization (performing electrodeposition coating at low voltage), followed by electrodeposition coating (referred to as a "two-step method").

Of the aforementioned two methods, since the method comprising immersing the substrate in the bath of the cationic electrodeposition coating composition of the present invention for a certain period (Step 1), and then performing electrodeposition coating (Step 2) can provide a dense passivation film, such a method is preferable in view of improving anti-corrosion properties.

In the above described "two-step method", a film can be formed by immersing the metal substrate in the bath of the cationic electrodeposition coating composition at a temperature of 15° C. to 55° C., preferably 20° C. to 50° C. By immersing the substrate for 10 to 600 seconds, preferably 30 to 480 seconds, and more preferably 40 to 300 seconds (Step 1), a dense passivation film can be formed on the substrate.

Subsequently, by applying an electric current at a voltage of 50 to 400 V, preferably 75 to 370 V, for 60 to 600 seconds, preferably 80 to 400 seconds (Step 2) using the metal substrate as a cathode, a film can be deposited on the substrate.

A deposition film having few defects can be uniformly formed when the temperature of the bath of the cationic electrodeposition coating composition is set at 10° C. to 55° C., and preferably 20° C. to 50° C. It is also possible to immerse the metal substrate in the electrodeposition coating composition bath, take the immersed metal substrate out of the bath, and then reimmerse the metal substrate in the bath, and perform electrodeposition coating.

The two-step coating film formation method can sequentially form on the first layer film (lower layer), the second layer film (upper layer) that mainly comprises a resin component, pigment, etc., which are completely different compositions from those of the first layer film, thereby providing a multilayer film structure having excellent anti-corrosion properties and finish.

The mechanism for depositing the film using the cationic electrodeposition coating composition is as follows.

When immersion is conducted in Step 1, the pH in the vicinity of the substrate is raised by the etching effect of the nitric acid root contained in the cationic electrodeposition coating composition; afterward, metal ions etc. (for example, zirconium hexafluoride ion etc.) that have undergone a hydrolysis reaction cause deposition of a poorly soluble film (lower layer) (mainly, for example, zirconium oxide) on the substrate.

The thus-obtained coating film is baked at a substrate surface temperature of 100° C. to 200° C., preferably 120° C. to 180° C. for 5 to 90 minutes, preferably 10 to 50 minutes.

Multilayer Coating Film on Electrodeposition Coating Film

On the electrodeposition coating film of the cationic electrodeposition coating composition of the present invention, a multilayer coating film is further formed by, for example, the following methods.

For example, a 2-coat 2-bake coating method (2C2B) is performed in such a manner that a second colored coating composition (solid color) is applied on a cured coating film of a first colored coating composition by a method, such as airless spray coating, air spray coating, rotary atomization coating, or the like, to a film thickness of about 10 to 50 μm (when dried), followed by heating at a baking temperature of about 100 to 180° C. for about 10 to 90 minutes. A 2-coat 1-bake coating method (2C1B) is performed in such a manner that a second colored coating composition (solid color) is applied wet-on-wet on a wet coating film of a first colored coating composition.

Other examples include a 3-coat 1-bake coating method (hereafter sometimes referred to as "3C1B") and a 3-coat 2-bake coating method (3C2B) in which a second colored coating composition is applied wet-on-wet on a wet coating film of a first colored coating composition by a method, such as airless spray coating, air spray coating, rotary atomization coating, or the like, to a film thickness of about 10 to 50 μm (when dried), and a clear coating composition is applied wet-on-wet or after being cured to a film thickness of about 10 to 70 μm (when cured), followed by heating at a baking temperature of about 60 to 160° C. for about 10 to 90 minutes; and the like.

Other examples include a 3-coat 2-bake coating method (3C2B) and a 3-coat 3-bake coating method (3C3B) in which a second colored coating composition is applied on a cured coating film of a first colored coating composition by a method, such as airless spray coating, air spray coating, rotary atomization coating, or the like, to a film thickness of about 10 to 50 μm (when dried), and a clear coating composition is applied wet-on-wet or after being cured to a film thickness of about 10 to 70 μm (when cured), followed by heating at a baking temperature of about 60 to 160° C. for about 10 to 90 minutes.

Among these methods, a 3-coat 1-bake coating method (3C1B) is particularly advantageous in terms of step-saving and severe corrosion test conditions because the cationic electrodeposition coating composition of the present invention provides, with excellent corrosion resistance in a combined corrosion cycle test, a multilayer coating film formed by a 3-coat 1-bake coating method (3C1B) on an electrodeposition coating film formed on an untreated steel sheet. Additionally, it is preferable to use an aqueous coating composition in terms of low volatile organic solvents (low VOC); a 3C1B method using an aqueous colored coating composition is described below.

Examples of base resins in the first colored aqueous coating composition include polyester resin, acrylic resin, urethane resin, epoxy resin, etc., which have a sufficient amount of hydrophilic groups (e.g., carboxyl group, hydroxyl group, methylol group, amino group, sulfonate group, polyoxyethylene binding, etc.) to render the resin water-soluble or water-dispersible; and functional groups (e.g., hydroxyl group and carboxyl group), which can undergo a cross-linking reaction with a cross-linking agent.

Such base resins may be, depending on the type of hydrophilic group present therein, made water-soluble or water-dispersible by, for example, performing neutralization using a basic substance or an acid. In the production of a base resin by polymerization, the base resin may also be made water-dispersible by conducting emulsion polymerization of the monomer component in the presence of a surfactant and/or a water-soluble polymer substance. Examples of cross-linking agents usable in the first colored aqueous coating composition include melamine resins, blocked polyisocyanate compounds, carbodiimide compounds, and the like.

The first colored aqueous coating composition may further contain, as necessary, an organic solvent, a thickener, a color pigment, a light interference pigment, an extender pigment, a dispersant, an antisettling agent, a catalyst promoting an urethanization reaction (e.g., organic tin compounds), a catalyst promoting a cross-linking reaction of a hydroxyl group of a base resin with a melamine resin (e.g., acid catalysts), a defoaming agent, a rust preventive, a UV absorber, a surface control agent, and the like. To the first colored aqueous coating composition, an adequate amount of water is added to adjust the solids content thereof to usually 30 to 70 mass, preferably 40 to 55 mass, in order to use it for a coating.

The first colored aqueous coating composition may be prepared by dissolving or dispersing each of the above components in an aqueous medium by a known method, and may be applied on the above-mentioned electrodeposition coating film after, for example, adjusting the viscosity thereof to 50 seconds at 20° C. using a Ford cup No. 4, and the solids content concentration to 20 to 70 massa, preferably 35 to 60 mass.

The application of the first colored aqueous coating composition may be performed using a known method, such as air spray, airless spray, electrostatic coating, or the like. The film thickness may usually be 10 to 100 μm, and preferably 10 to 35 μm (when dried).

With respect to the coated coating film, the coated substrate may usually be directly or indirectly preheated in a drying furnace at 60 to 120° C., preferably at 70 to 110° C. for about 1 to about 60 minutes; alternatively, setting may be performed on the coated surface of the coated substrate at room temperature or at 25 to less than 70° C.

According to the method of forming a multilayer coating film by a 3C1B method, a second colored aqueous coating composition is applied on an uncured coating film comprising a first colored aqueous coating composition. As the second colored aqueous coating composition, an aqueous colored coating composition is utilized from the viewpoint of reducing volatile organic compounds (VOC reduction).

The usable second colored aqueous coating composition may contain, for example, a base resin such as polyester resin, acrylic resin, alkyd resin, urethane resin, epoxy resin, etc., which have a cross-linkable functional group such as carboxyl, hydroxyl, carbonyl, amino, etc., as mentioned above with respect to the first colored aqueous coating composition; and a cross-linking agent such as polyisocyanate compounds that may be blocked, melamine resin, urea resin, carbodiimide compound, hydrazide, semicarbazide, epoxy resin, etc., as mentioned above with respect to the first colored aqueous coating composition.

The second colored aqueous coating composition may further suitably contain, as necessary, a pigment, a defoaming agent, a thickener, a rust preventive, a UV absorber, a surface control agent, and the like.

To the second colored aqueous coating composition, an adequate amount of water is added to adjust the solids content thereof to usually 5 to 50 mass, preferably 15 to 30 mass % so as to perform a coating. The application of the second colored aqueous coating composition may be performed using a known method, such as air spray, airless spray, electrostatic coating, or the like. The film thickness may be 5 to 40 μm, and preferably 10 to 30 μm (when dried).

The coated coating film may be appropriately subjected to preheating and/or setting. Preheating may generally be performed by directly or indirectly heating a coated substrate in a drying furnace at 60 to 120° C., preferably at 70 to 120° C. for about 1 to about 60 minutes. Setting may be performed on the coated surface of a coated substrate at room temperature or at 25 to less than 70° C.

A clear coating composition is applied on an uncured coating film comprising the second colored coating composition obtained in the above manner. The clear coating composition may be an organic solvent-based clear coating composition or an aqueous clear coating composition, which are usually used, for example, in the coating of an automobile body.

Usable organic solvent-based clear coating compositions or aqueous clear coating compositions may be those containing, as a base resin, acrylic resin, polyester resin, alkyd resin, urethane resin, epoxy resin, etc. that have a cross-linkable functional group such as hydroxyl, carboxyl, epoxy, etc.; and as cross-linking agents, melamine resin, urea resin, a polyisocyanate compound that may be blocked, a carboxyl-containing compound or resin, an epoxy-containing compound or resin; and the like (e.g., an acid/epoxy resin curing-type clear coating composition).

The clear coating composition may contain, as necessary, a coloring pigment and/or a light interference pigment in an amount that does not impair the transparency of the coating film. The clear coating composition may further suitably contain an extender pigment, a UV absorber, etc. The clear coating composition may be applied on the surface of a coating film comprising the second colored aqueous coating composition using a known method, such as electrostatic coating, airless spray, air spray, or the like. The film thickness is usually 10 to 60 µm, and preferably 25 to 50 µm (when dried).

The thus-obtained multilayer coating film comprising three layers of uncured coating films, i.e., a coating film of the first colored aqueous coating composition, a coating film of the second colored aqueous coating composition and a coating film of the clear coating composition, is simultaneously cured by heating at 80 to 170° C., preferably 120 to 160° C. for about 20 to about 40 minutes with a typical means for baking, such as hot-air heating, infrared heating, induction heating, or the like. Thereby, a multilayer coating film having excellent finish and corrosion resistance can be obtained.

EXAMPLES

The present invention is explained in detail below with reference to production examples, examples, and comparative examples; however, the present invention is not limited thereto. In the examples, "parts" and "%" are by mass.

Production of Amino Group-Containing Modified Epoxy Resin (A)

Production Example 1

Production Example of Base Resin No. 1

A 2-liter flask equipped with a thermometer, a reflux condenser, and a stirrer was charged with 296 parts of Glyci-ale PP-300P (Note 1), 1,330 parts of jER828EL (Note 4), 684 parts of bisphenol A, and 1.0 parts of tetrabutylammonium bromide. The mixture was allowed to react at 160° C. until the epoxy equivalent became 1,150.

Next, 611 parts of methyl isobutyl ketone, and then 137 parts of monomethylaminoethanol were added to the reaction mixture, and allowed to react at 120° C. for 4 hours. The solution of base resin No. 1, which was an amino group-containing modified epoxy resin with a resin solids content of 80%, was thus obtained. Base resin No. 1 had an amine value of 41 mg KOH/g, and a number average molecular weight of 2,700.

Production Example 2

Production example of base resin No. 2

A 2-liter flask equipped with a thermometer, a reflux condenser, and a stirrer was charged with 185 parts of Denacol EX-821 (Note 2), 950 parts of jER828EL (Note 4), 456 parts of bisphenol A, and 0.8 parts of tetrabutylammonium bromide. The mixture was allowed to react at 160° C. until the epoxy equivalent became 795.

Next, 368 parts of methyl isobutyl ketone, and then 110 parts of diethyl amine, and 95 parts of a ketimine of diethylenetriamine with methyl isobutyl ketone (purity: 84%, methyl isobutyl ketone solution) were added to the reaction mixture, and allowed to react at 120° C. for 4 hours. The solution of base resin No. 2, which was an amino group-containing modified epoxy resin with a resin solids content of 80%, was thus obtained. Base resin No. 2 had an amine value of 68 mg KOH/g, and a number average molecular weight of 2,000.

Production Example 3

Production example of base resin No. 3

A 2-liter flask equipped with a thermometer, a reflux condenser, and a stirrer was charged with 340 parts of Glyci-ale BPP-350 (Note 3), 950 parts of jER828 EL (Note 4), 456 parts of bisphenol A, and 0.8 parts of tetrabutylammonium bromide. The mixture was allowed to react at 160° C. until the epoxy equivalent became 873.

Next, 407 parts of methyl isobutyl ketone, and then 113 parts of monomethylaminoethanol, and 95 parts of a ketimine of diethylenetriamine with methyl isobutyl ketone (purity: 84%, methyl isobutyl ketone solution) were added to the reaction mixture, and allowed to react at 120° C. for 4 hours. The solution of base resin No. 3, which was an amino group-containing modified epoxy resin with a resin solids content of 80%, was thus obtained. Base resin No. 3 had an amine value of 62 mg KOH/g, and a number average molecular weight of 2,200.

Production Example 4

Production Example of Base Resin No. 4

A 2-liter flask equipped with a thermometer, a reflux condenser, and a stirrer was charged with 296 parts of Glyci-ale PP-300P (Note 1), 1,330 parts of jER828EL (Note 4), 684 parts of bisphenol A, and 1.0 parts of tetrabutylammonium bromide. The mixture was allowed to react at 160° C. until the epoxy equivalent became 1,150.

Next, 611 parts of propylene glycol monomethyl ether, and then 20 parts of diethylaminopropylamine, and 114 parts of monomethylaminoethanol were added to the reaction mixture, and allowed to react at 120° C. for 4 hours. The solution of base resin No. 4, which was an amino group-containing modified epoxy resin with a resin solids content of 80%, was thus obtained. Base resin No. 4 had an amine value of 41 mg KOH/g, and a number average molecular weight of 2,700.

Table 1 shows the formulations and the characteristic values of base resins Nos. 1 to 4 obtained in Production Examples 1 to 4.

80%, was thus obtained. Base resin No. 5 had an amine value of 47 mg KOH/g, and a number average molecular weight of 2,500.

TABLE 1

| | | | | Production Example 1 | Production Example 2 | Production Example 3 | Production Example 4 |
|---|---|---|---|---|---|---|---|
| | | | Base resin | No. 1 | No. 2 | No. 3 | No. 4 |
| Formulation | (A1) | (a1) | Glyci-ale PP-300P (Note 1) | 296 | | | 296 |
| | | | Denacol EX-821 (Note 2) | | 185 | | |
| | | | Glyci-ale BPP-350 (Note 3) | | | 340 | |
| | | (a2) | jER828EL (Note 4) | 1330 | 950 | 950 | 1330 |
| | | (a3) | Bisphenol A | 684 | 456 | 456 | 684 |
| | | Catalyst | Tetrabutylammonium bromide | 1.0 | 0.8 | 0.8 | 1.0 |
| | | Solvent | Methyl isobutyl ketone | | 368 | 407 | |
| | | | Propylene glycol monomethyl ether | 611 | | | 611 |
| | (A2) | | Mono methyl amino ethanol | 137 | | 113 | 114 |
| | | | Diethyl amino propyl amine | | | | 20 |
| | | | Diethyl amine | | 110 | | |
| | | | Ketimine of diethylenetriamine with methyl isobutyl ketone | | 95 | 95 | |
| Characteristic value | | | Amine value (mg KOH/g) | 41 | 68 | 62 | 41 |
| | | | Number average molecular weight | 2700 | 2000 | 2200 | 2700 |

The numerals in the formulations are by parts.
(Note 1) Glyci-ale PP-300P: trade name of an epoxy resin (diepoxy compound (a1)) produced by Sanyo Chemical Industries, Ltd.; epoxy equivalent: 296; corresponding to compound (2) ($R^3$ = $CH_3$, X = 1, Y = 7)
(Note 2) Denacol EX-821: trade name of an epoxy resin (diepoxy compound (a1)) produced by Nagase ChemteX Corporation; epoxy equivalent: 185; corresponding to compound (2) ($R^3$ = hydrogen atom, X = 1, Y = 4)
(Note 3) Glyci-ale BPP-350: trade name of an epoxy resin (diepoxy compound (a1)) produced by Sanyo Chemical Industries, Ltd.; epoxy equivalent: 340; corresponding to compound (1) ($R^1$ = $CH_3$, $R^2$ = $CH_3$, m + n = 3)
(Note 4) jER828EL: trade name of an epoxy resin (a2) produced by Japan Epoxy Resin; epoxy equivalent: 190; number average molecular weight: 380

Synthesis Example 1

Production of Xylene-Formaldehyde Resin

A 2-liter separable flask equipped with a thermometer, a reflux condenser, and a stirrer was charged with 480 parts of 50% formalin, 110 parts of phenol, 202 parts of 98% industrial sulfuric acid, and 424 parts of m-xylene. The resulting mixture was allowed to react at 84° C. to 88° C. for 4 hours. After the reaction was completed, the reaction mixture was allowed to stand to separate a resin phase and a sulfuric acid aqueous phase. The resin phase was washed with water 3 times, and then unreacted m-xylene was removed under the conditions of 20 to 30 mmHg and 120° C. to 130° C. for 20 minutes. As a result, 480 parts of a phenol-modified xylene-formaldehyde resin having a viscosity of 1,050 mPa·s (25° C.) were obtained.

Production Example 5

Production Example of Base Resin No. 5

A flask was charged with 1,140 parts of jER828EL (Note 4), 456 parts of bisphenol A, and 0.2 parts of dimethylbenzylamine. The mixture was allowed to react at 130° C. until the epoxy equivalent became 820.

Next, 420 parts of methylisobutylketone, and then 300 parts of the xylene-formaldehyde resin obtained in Synthesis Example 1 were added to the reaction mixture. 95 parts of diethanol amine and 127 parts of a ketimine of diethylenetriamine with methyl isobutyl ketone (purity: 84%, methyl isobutyl ketone solution) were then added to the resulting mixture and allowed to react at 120° C. for 4 hours. The solution of base resin No. 5, which was an amino group-containing modified epoxy resin with a resin solids content of Production of Blocked Polyisocyanate Curing Agent (B)

Production Example 6

Production Example of Curing Agent 270 parts of Cosmonate M-200 (trade name of crude MDI produced by Mitsui Chemicals, Inc.) and 127 parts of methyl isobutyl ketone were added to a reaction vessel and heated to 70° C. 236 parts of ethylene glycol monobutyl ether were added dropwise over 1 hour, and the mixture was heated to 100° C. The mixture was sampled over time while the temperature was maintained; when no absorption by unreacted isocyanate groups was observed by infrared absorption spectrometry, a curing agent with a resin solids content of 80% was obtained.

Production Example 7

Production Example of Resin for Pigment Dispersion 1,010 parts of jER828EL (Note 4) were blended with 390 parts of bisphenol A, 240 parts of PLACCEL 212 (trade name of polycaprolactonediol produced by Daicel Chemical Industries; weight average molecular weight: about 1,250) and 0.2 parts of dimethylbenzylamine, and the mixture was allowed to react at 130° C. until the epoxy equivalent became about 1,090.

Next, 134 parts of dimethylethanolamine and 150 parts of a 90% aqueous lactic acid solution were added to the reaction mixture, and then allowed to react at 120° C. for 4 hours. Methyl isobutyl ketone was subsequently added to the reaction mixture to adjust the solids content, thereby obtaining an ammonium salt-type resin for pigment dispersion having a solids content of 60%. The aforementioned resin for pigment dispersion had an ammonium salt concentration of 0.78 mmol/g.

Production Example 8

Production Example of Pigment Dispersion Paste 8.3 parts (solids content: 5 parts) of the resin for pigment dispersion having a solids content of 60% that were obtained in Production Example 7, 14.5 parts of titanium oxide, 7.0 parts of refined clay, 0.3 parts of carbon black, 1 part of dioctyltin oxide, 1 part of bismuth hydroxide, and 20.3 parts of deionized water were added into a ball mill and dispersed for 20 hours. A pigment dispersion paste with a solids content of 55% was thus obtained.

Production of Emulsion

Production Example 9

Production Example of Emulsion No. 1

81.3 parts (solids content: 65 parts) of base resin No. 1 obtained in Production Example 1 were mixed with 37.5 parts (solids content: 30 parts) of the curing agent obtained in Production Example 5. 15.0 parts of 10% acetic acid were further added to the resulting mixture and uniformly stirred. Thereafter, 155.2 parts of deionized water were added dropwise over about 15 minutes with vigorous stirring to thereby obtain emulsion No. 1 with a solids content of 34%.

Production Examples 10 to 16

Production Examples of Emulsions Nos. 2 to 8

Emulsions Nos. 2 to 8 were obtained in the same manner as in Production Example 9, except that the formulations shown in Table 2 were used.

TABLE 2

|  |  | Pro. Exam. 9 | Pro. Exam. 10 | Pro. Exam. 11 | Pro. Exam. 12 | Pro. Exam. 13 | Pro. Exam. 14 | Pro. Exam. 15 | Pro. Exam. 16 |
|---|---|---|---|---|---|---|---|---|---|
|  | Emulsion | No. 1 | No. 2 | No. 3 | No. 4 | No. 5 | No. 6 | No. 7 | No. 8 |
| Component A | Base resin No. 1 (solids content 80%) | 87.5 (70) |  |  |  | 62.5 (50) | 43.8 (35) | 12.5 (10) |  |
|  | Base resin No. 2 (solids content 80%) |  | 87.5 (70) |  |  |  |  |  |  |
|  | Base resin No. 3 (solids content 80%) |  |  | 87.5 (70) |  |  |  |  |  |
|  | Base resin No. 4 (solids content 80%) |  |  |  | 87.5 (70) | 25.0 (20) | 43.8 (35) | 75.0 (60) |  |
|  | Base resin No. 5 (solids content 80%) |  |  |  |  |  |  |  | 87.5 (70) |
| Component B | Curing agent | 37.5 (30) | 37.5 (30) | 37.5 (30) | 37.5 (30) | 37.5 (30) | 37.5 (30) | 37.5 (30) | 37.5 (30) |
|  | 10% Acetic acid | 15.0 | 15.0 | 15.0 | 15.0 | 15.0 | 15.0 | 15.0 | 15.0 |
|  | Deionized water | 154.0 | 154.0 | 154.0 | 154.0 | 154.0 | 153.9 | 154.0 | 154.0 |
|  | Total (Solids content 34%) | 294.0 (100) | 294.0 (100) | 294.0 (100) | 294.0 (100) | 294.0 (100) | 294.0 (100) | 294.0 (100) | 294.0 (100) |

The parenthesized numerals in the formulations denote the solids content.

Production of Cationic Electrodeposition Coating Composition

Example 1

294 parts (solids content: 100 parts) of emulsion No. 1, 52.4 parts (solids content: 28.8 parts) of 55% pigment dispersion paste obtained in Production Example 8, and 653.6 parts of deionized water were mixed to obtain 1,000 parts of a bath. Subsequently, 14.0 parts of 10% zirconium hydrofluoric acid, and 10 parts of 10% nitric acid were added to the bath to obtain cationic electrodeposition coating composition No. 1.

Examples 2 to 28

Cationic electrodeposition coating compositions Nos. 2 to 28 were produced in the same manner as in Example 1, except that the formulations shown in Tables 3 to 5 were used.

TABLE 3

| | | Exam. 1 | Exam. 2 | Exam. 3 | Exam. 4 | Exam. 5 | Exam. 6 | Exam. 7 | Exam. 8 |
|---|---|---|---|---|---|---|---|---|---|
| | Cationic electrodeposition coating composition | No. 1 | No. 2 | No. 3 | No. 4 | No. 5 | No. 6 | NO. 7 | No. 8 |
| EM | Emulsion No. 1 | 294.0 (100) | | | | | | | 294.0 (100) |
| | Emulsion No. 2 | | 294.0 (100) | | | | | | |
| | Emulsion No. 3 | | | 294.0 (100) | | | | | |
| | Emulsion No. 4 | | | | 294.0 (100) | | | | |
| | Emulsion No. 5 | | | | | 294.0 (100) | | | |
| | Emulsion No. 6 | | | | | | 294.0 (100) | | |
| | Emulsion No. 7 | | | | | | | 294.0 (100) | |
| PP | Pigment dispersion paste | 52.4 (28.8) | 52.4 (28.8) | 52.4 (28.8) | 52.4 (28.8) | 52.4 (28.8) | 52.4 (28.8) | 52.4 (28.8) | 52.4 (28.8) |
| | Deionized water | 653.6 | 653.6 | 653.6 | 653.6 | 653.6 | 653.6 | 653.6 | 653.6 |
| | Total (12.8% bath) | 1000 (128.8) | 1000 (128.8) | 1000 (128.8) | 1000 (128.8) | 1000 (128.8) | 1000 (128.8) | 1000 (128.8) | 1000 (128.8) |
| Component C | 10% Zirconium hydrofluoric acid $H_2ZrF_6$ | 14.0 (1.4) | 14.0 (1.4) | 14.0 (1.4) | 14.0 (1.4) | 14.0 (1.4) | 14.0 (1.4) | 14.0 (1.4) | |
| | 10% Titanium hydrofluoric acid $H_2TiF_6$ | | | | | | | | 21.0 (2.1) |
| Component E | 10% Nitric acid | 10.0 | 10.0 | 10.0 | 10.0 | 10.0 | 10.0 | 10.0 | 10.0 |
| Relative to the mass of the cationic electrodeposition coating composition | Mass of metal of component C (ppm) | 600 | 600 | 600 | 600 | 600 | 600 | 600 | 600 |
| | Mass of nitrogen oxide ion (ppm) | 1000 | 1000 | 1000 | 1000 | 1000 | 1000 | 1000 | 1000 |

The parenthesized numerals in the formulations denote the solids content.

TABLE 4

(continuation of Table 3)

| | | | Ex. 9 | Ex. 10 | Ex. 11 | Ex. 12 | Ex. 13 | Ex. 14 |
|---|---|---|---|---|---|---|---|---|
| | | Cationic electrodeposition coating composition | No. 9 | No. 10 | No. 11 | No. 12 | No. 13 | No. 14 |
| EM | | Emulsion No. 1 | 294.0 (100) | 294.0 (100) | 294.0 (100) | 294.0 (100) | 294.0 (100) | 294.0 (100) |
| PP | | Pigment dispersion paste | 52.4 (28.8) | 52.4 (28.8) | 52.4 (28.8) | 52.4 (28.8) | 52.4 (28.8) | 52.4 (28.8) |
| | | Deionized water | 653.6 | 653.6 | 653.6 | 653.6 | 653.6 | 653.6 |
| | | Total (12.8% bath) | 1000 (128.8) | 1000 (128.8) | 1000 (128.8) | 1000 (128.8) | 1000 (128.8) | 1000 (128.8) |
| Component C | | 10% Zirconium hydrofluoric acid $H_2ZrF_6$ | | | | | | |
| | | 10% Zirconyl nitrate $ZrO(NO_3)_2$ | 15.2 (1.5) | | | | | |
| | | 10% Zinc nitrate $Zn(NO_3)_2$ | | 31.0 (3.1) | | | | |

TABLE 4-continued (continuation of Table 3)

|  |  | | | | | | |
|---|---|---|---|---|---|---|---|
|  | 10% Yttrium nitrate Y(NO$_3$)$_3$ |  |  | 19.0 (1.9) |  |  |  |
|  | 10% Copper nitrate Cu(NO$_3$)$_2$ |  |  |  | 18.0 (1.8) |  |  |
|  | 10% Ytterbium nitrate Yb(NO$_3$)$_3$ |  |  |  |  | 13.0 (1.3) |  |
|  | 10% Cerium nitrate Ce(NO$_3$)$_3$ |  |  |  |  |  | 14.0 (1.4) |
|  | 10% Indium nitrate In(NO$_3$)$_3$ |  |  |  |  |  |  |
|  | 10% Bismuth nitrate Bi(NO$_3$)$_3$ |  |  |  |  |  |  |
| Component E | 10% Nitric acid | 1.8 | 4.3 | 3.7 | 4.2 | 3.5 | 2.0 |
| Relative to the mass of the cationic electrodeposition coating composition | Mass of metal of component C (ppm) | 600 | 600 | 600 | 600 | 600 | 600 |
|  | Mass of nitrogen oxide ion (ppm) | 1000 | 1130 | 1250 | 1160 | 1000 | 1000 |

|  |  | Ex. 15 | Ex. 16 | Ex. 17 | Ex. 18 | Ex. 19 | Ex. 20 |
|---|---|---|---|---|---|---|---|
|  | Cationic electrodeposition coating composition | No. 15 | No. 16 | No. 17 | No. 18 | No. 19 | No. 20 |
| EM | Emulsion No. 1 | 294.0 (100) | 294.0 (100) | 294.0 (100) | 294.0 (100) | 294.0 (100) | 294.0 (100) |
| PP | Pigment dispersion paste | 52.4 (28.8) | 52.4 (28.8) | 52.4 (28.8) | 52.4 (28.8) | 52.4 (28.8) | 52.4 (28.8) |
|  | Deionized water | 653.6 | 653.6 | 653.6 | 653.6 | 653.6 | 653.6 |
|  | Total (12.8% bath) | 1000 (128.8) | 1000 (128.8) | 1000 (128.8) | 1000 (128.8) | 1000 (128.8) | 1000 (128.8) |
| Component C | 10% Zirconium hydrofluoric acid H$_2$ZrF$_6$ |  |  | 14.0 (1.4) | 14.0 (1.4) | 14.0 (1.4) | 14.0 (1.4) |
|  | 10% Zirconyl nitrate ZrO(NO$_3$)$_2$ |  |  |  |  |  |  |
|  | 10% Zinc nitrate Zn(NO$_3$)$_2$ |  |  |  | 31.0 (3.1) |  |  |
|  | 10% Yttrium nitrate Y(NO$_3$)$_3$ |  |  |  |  | 19.0 (1.9) |  |
|  | 10% Copper nitrate Cu(NO$_3$)$_2$ |  |  |  |  |  |  |
|  | 10% Ytterbium nitrate Yb(NO$_3$)$_3$ |  |  |  |  |  | 13.0 (1.3) |
|  | 10% Cerium nitrate Ce(NO$_3$)$_3$ |  |  |  |  |  | 14.0 (1.4) |
|  | 10% Indium nitrate In(NO$_3$)$_3$ | 21.0 (2.1) |  |  |  |  |  |
|  | 10% Bismuth nitrate Bi(NO$_3$)$_3$ |  | 11.0 (1.1) |  |  |  |  |
| Component E | 10% Nitric acid | 0.3 | 4.7 | 4.3 | 3.7 | 3.5 | 2.0 |
| Relative to the mass of the cationic electrodeposition coating composition | Mass of metal of component C (ppm) | 600 | 600 | 1200 | 1200 | 1200 | 1200 |
|  | Mass of nitrogen oxide ion (ppm) | 1000 | 1000 | 1130 | 1250 | 1000 | 1000 |

The parenthesized numerals in the formulations denote the solids content.

TABLE 5

(continuation of Table 3)

|  |  | Ex. 21 | Ex. 22 | Ex. 23 | Ex. 24 | Ex. 25 | Ex. 26 | Ex. 27 | Ex. 28 |
|---|---|---|---|---|---|---|---|---|---|
|  | Cationic electrodeposition coating composition | No. 21 | No. 22 | No. 23 | No. 24 | No. 25 | No. 26 | NO. 27 | No. 28 |
| EM | Emulsion No. 1 | 294.0 (100) | 294.0 (100) | 294.0 (100) | 294.0 (100) | 294.0 (100) | 294.0 (100) | 294.0 (100) | 294.0 (100) |
| PP | Pigment dispersion paste | 52.4 (28.8) | 52.4 (28.8) | 52.4 (28.8) | 52.4 (28.8) | 52.4 (28.8) | 52.4 (28.8) | 52.4 (28.8) | 52.4 (28.8) |
|  | Deionized water | 653.6 | 653.6 | 653.6 | 653.6 | 653.6 | 653.6 | 653.6 | 653.6 |
|  | Total (12.8% bath) | 1000 (128.8) | 1000 (128.8) | 1000 (128.8) | 1000 (128.8) | 1000 (128.8) | 1000 (128.8) | 1000 (128.8) | 1000 (128.8) |

TABLE 5-continued (continuation of Table 3)

|  |  | Ex. 21 | Ex. 22 | Ex. 23 | Ex. 24 | Ex. 25 | Ex. 26 | Ex. 27 | Ex. 28 |
|---|---|---|---|---|---|---|---|---|---|
| Component C | 10% Zirconium hydrofluoric acid $H_2ZrF_6$ |  |  |  |  | 6.8 (0.68) | 6.8 (0.68) | 6.8 (0.68) | 6.8 (0.68) |
|  | 10% Titanium hydrofluoric acid $H_2TiF_6$ |  |  |  |  | 10.3 (1.03) |  |  |  |
|  | 10% Cobalt nitrate $Co(No_3)_2$ | 19.0 (1.9) |  |  |  |  |  |  |  |
|  | 10% Praseodymium nitrate $Pr(No_3)_3$ |  | 14.0 (1.4) |  |  |  |  | 14.0 (1.4) |  |
|  | 10% Zinc acetate $Zn(CH_3COO)_2$ |  |  |  |  |  |  | 17.0 (1.7) |  |
|  | 10% Cerium acetate $Ce(CH_3COO)_3$ |  |  | 14.0 (1.4) |  |  |  |  | 14.0 (1.4) |
|  | 10% Neodymium acetate $Nd(CH_3COO)_3$ |  |  |  | 18.0 (1.8) |  |  |  |  |
| Component E | 10% Nitric acid |  | 2.1 | 10.0 | 10.0 | 10.0 | 2.1 | 10.0 | 10.0 |
| Relative to the mass of the cationic electrodeposition coating composition | Mass of metal of component C (ppm) | 600 | 600 | 600 | 600 | 1200 | 1200 | 1200 | 1200 |
|  | Mass of nitrogen oxide ion (ppm) | 1260 | 1000 | 1000 | 1000 | 1000 | 1000 | 1000 | 1000 |

The parenthesized numerals in the formulations denote the solids content.

Comparative Examples 1 to 6

Cationic electrodeposition coating compositions Nos. 29 to 34 were produced in the same manner as in Example 1, except that the formulations shown in Table 6 were used.

TABLE 6

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
|  | Cationic electrodeposition coating composition | No. 29 | No. 30 | No. 31 | No. 32 | No. 33 | No. 34 |
| EM | Emulsion No. 1 |  | 294.0 (100) | 294.0 (100) | 294.0 (100) | 294.0 (100) | 294.0 (100) |
|  | Emulsion No. 8 | 294.0 (100) |  |  |  |  |  |
| PP | Pigment dispersion paste | 52.4 (28.8) | 52.4 (28.8) | 52.4 (28.8) | 52.4 (28.8) | 52.4 (28.8) | 52.4 (28.8) |
|  | Deionized water | 653.6 | 653.6 | 653.6 | 653.6 | 653.6 | 653.6 |
|  | 12.8% Bath | 1000 (128.8) | 1000 (128.8) | 1000 (128.8) | 1000 (128.8) | 1000 (128.8) | 1000 (128.8) |
| Component C | 10% Zirconium hydrofluoric acid $H_2ZrF_6$ | 14.0 (1.4) | 0.2 (0.02) | 14.0 (1.4) |  | 28.0 |  (2.8) |
|  | 10% Titanium hydrofluoric acid $H_2TiF_6$ |  |  |  |  | 21.0 (2.1) |  |
| Component E | 10% Nitric acid | 10.0 | 10.0 | — | 10.0 | — | — |
| Relative to the mass of the cationic | Mass of metal of Component C (ppm) | 600 | 8 | 600 | — | 600 | 1200 |

TABLE 6-continued

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| electrodeposition coating composition | Mass of nitrogen oxide ion (ppm) | 1000 | 1000 | — | 1000 | — | — |

The parenthesized numerals in the formulations denote the solids content.

Substrate

Cold rolled steel sheets (70 mm×150 mm×0.8 mm) that had not been subjected to chemical conversion treatment were immersed in an ultrasonic cleaner containing toluene, and subjected to ultrasonic degreasing for 30 minutes, thereby obtaining "substrates".

Preparation and Evaluation of Test Sheets Each Containing a Cationic Electrodeposition Coating Film The temperature of each bath of cationic electrodeposition coating compositions Nos. 1 to 34 was adjusted to 40° C., and a "substrate" was immersed in a bath for 120 seconds (Step 1). Electrodeposition coating (Step 2) was then performed at 200V, for 180 seconds, and baking was conducted at 170° C. for 20 minutes, thereby obtaining a test sheet having a thickness of 15 μm (when dried). Each test sheet was evaluated according to the following conditions. Tables 7 to 9 show the results of the Examples, and Table 10 shows the results of the Comparative Examples.

TABLE 7

|  | Example 1 | Example 2 | Example 3 | Example 4 | Example 5 | Example 6 | Example 7 | Example 8 |
|---|---|---|---|---|---|---|---|---|
| Cationic electrodeposition coating composition | No. 1 | No. 2 | No. 3 | No. 4 | No. 5 | No. 6 | No. 7 | No. 8 |
| Finish (coating film condition) (Note 5) | B | B | B | B | B | B | B | B |
| Hot salt water immersion resistance (Note 6) | B | B | B | B | B | B | B | B |
| Combined corrosion cycle test (Note 7) | B | B | B | B | B | B | B | B |
| Coating composition stability (Note 8) | B | B | B | B | B | B | B | B |
| Comprehensive evaluation (Note 9) | B | B | B | B | B | B | B | B |

TABLE 8

| (continuation of Table 7) | | | | | | | | | | | | |
|---|---|---|---|---|---|---|---|---|---|---|---|---|
|  | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
| Cationic electrodeposition coating composition | No. 9 | No. 10 | No. 11 | No. 12 | No. 13 | No. 14 | No. 15 | No. 16 | No. 17 | No. 18 | No. 19 | No. 20 |
| Finish (coating film condition) (Note 5) | B | B | B | B | B | B | B | B | B | B | B | B |
| Hot salt water immersion resistance (Note 6) | B | B | B | B | B | B | B | B | A | A | A | A |
| Combined corrosion cycle test (Note 7) | B | B | B | B | B | B | B | B | A | A | A | A |
| Coating composition stability | B | B | B | B | B | B | B | B | B | B | B | B |

TABLE 8-continued (continuation of Table 7)

|  | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
| --- | --- | --- | --- | --- | --- | --- | --- | --- | --- | --- | --- | --- |
| (Note 8) |  |  |  |  |  |  |  |  |  |  |  |  |
| Comprehensive evaluation (Note 9) | B | B | B | B | B | B | B | B | A | A | A | A |

TABLE 9

(continuation of Table 7)

|  | Example 21 | Example 22 | Example 23 | Example 24 | Example 25 | Example 26 | Example 27 | Example 28 |
| --- | --- | --- | --- | --- | --- | --- | --- | --- |
| Cationic electrodeposition coating composition | No. 21 | No. 22 | No. 23 | No. 24 | No. 25 | No. 26 | No. 27 | No. 28 |
| Finish (coating film condition) (Note 5) | B | B | B | B | B | B | B | B |
| Hot salt water immersion resistance (Note 6) | B | B | B | B | A | A | A | A |
| Combined corrosion cycle test (Note 7) | B | B | B | B | A | A | A | A |
| Coating composition stability (Note 8) | B | B | B | B | B | B | B | B |
| Comprehensive evaluation (Note 9) | B | B | B | B | A | A | A | A |

TABLE 10

|  | Comp. Exam. 1 | Comp. Exam. 2 | Comp. Exam. 3 | Comp. Exam. 4 | Comp. Exam. 5 | Comp. Exam. 6 |
| --- | --- | --- | --- | --- | --- | --- |
| Cationic electrodeposition coating composition | No. 29 | No. 30 | No. 31 | No. 32 | No. 33 | No. 34 |
| Finish (coating film condition) (Note 5) | B | — | — | — | — | — |
| Hot salt water immersion resistance (Note 6) | D | D | C | D | C | C |
| Combined corrosion cycle test (Note 7) | D | D | C | D | C | C |
| Coating composition | D | B | B | B | B | B |

TABLE 10-continued

| | Comp. Exam. 1 | Comp. Exam. 2 | Comp. Exam. 3 | Comp. Exam. 4 | Comp. Exam. 5 | Comp. Exam. 6 |
|---|---|---|---|---|---|---|
| stability (Note 8) | | | | | | |
| Comprehensive evaluation (Note 9) | D | D | D | D | D | D |

(Note 5) Finish (condition of coating film): Each test sheet was cut, and the conditions of the coating films (lower layer and upper layer) were observed using HF-2000 (a field emission transmission electron microscope produced by Hitachi Ltd.). The conditions of the coating films were evaluated according to the following criteria. B: The boundary between the coating films (lower layer and upper layer) was unclear, but slight layer separation was observed. —: No layer separation was observed.
(Note 6) Hot salt water immersion resistance: Each test sheet was cross-cut, and immersed in 5 wt. % of salt water at 55° C. for 240 hours. A Sellotape (trade mark) peeling test was then performed. In the region from which the coating film peeled off, the portion having the longest distance from the cut was measured. A: The portion from the cut was less than 2.0 mm (on one side). B: The portion from the cut was not less than 2.0 mm and less than 3.0 mm (on one side). C: The portion from the cut was not less than 3.0 mm and less than 4.0 mm (on one side). D: The portion from the cut was not less than 4.0 mm (on one side).
(Note 7) Combined corrosion cycle test: Each test sheet was spray-coated with WP-306 (trade name of a first colored aqueous coating composition produced by Kansai Paint Co., Ltd.) to a cured film thickness of 25 μm, and allowed to stand for 2 minutes. Preheating was then conducted at 80° C. for 5 minutes. The first colored aqueous coating film was name of a second colored aqueous coating composition produced by Kansai Paint Co., Ltd.) to a cured film thickness of 15 μm, and allowed to stand for 2 minutes. Preheating was then conducted at 80° C. for 5 minutes. Subsequently, KINO#1200 (trade name of a clear coating composition produced by Kansai Paint Co., Ltd.) was applied to a cured film thickness of 35 μm, and the resultant was allowed to stand for 7 minutes. Baking at 140° C. for 30 minutes in an electric hot air dryer was then performed to obtain a test sheet for a combined corrosion cycle test. The obtained test sheet was cross-cut with a knife so that the cut reached the substrate. The following condition was considered as one cycle, and 100 cycles were performed. The test sheet was then evaluated. (Cycle condition: hot air drying (50° C.), 3 hours; salt water spraying, 6 hours; cold air blowing (RT), 1 hour; and moistening (50° C., RH 95%), 14 hours) Each test sheet was evaluated based on the width of rust or blister from the cut portion. A: The maximum width of rust or blister from the cut was less than 2.0 mm (on one side). B: The maximum width of rust or blister from the cut was not less than 2.0 mm and less than 3.0 mm (on one side). C: The maximum width of rust or blister from the cut was not less than 3.0 mm and less than 4.0 mm (on one side). D: The maximum width of rust or blister from the cut was not less than 4.0 mm (on one side).
(Note 8) Coating composition stability: Each of the film forming agents was sealed in a vessel at 30° C. for 30 minutes and then stirred. Thereafter, the total amount of film forming agent was filtered through a 400-mesh sieve. The amount of residue (mg/L) was measured. B: less than 10 mg/L C: Not less than 10 mg/L, and less than 15 mg/L D: Not less than 15 mg/L
(Note 9) Comprehensive evaluation: In the field of cationic electrodeposition coating to which the present invention belongs, it is desirable that the cationic electrodeposition coating composition excel in terms of finish, hot salt water immersion resistance, resistance to combined corrosion (hot air, cold air, and salt), and coating composition stability. It is most desirable that the cationic electrodeposition coating composition receive the highest rating for all of the four properties (A is the highest rating for hot salt water immersion resistance, and combined corrosion cycle test; and B is the highest rating for finish and coating composition stability). Accordingly, a comprehensive evaluation was conducted according to the following criteria: A: Hot salt water immersion resistance and combined corrosion cycle test were rated as A, and finish and coating composition stability were rated as B. B: Four properties were rated as A or B, including not more than one A. C: Four properties were rated as A, B, or C, including at least one C. D: Of the four properties, at least one property was rated as D or "—".

INDUSTRIAL APPLICABILITY

The present invention can provide a coated article that exhibits excellent anti-corrosion properties even on an untreated steel sheet.

The invention claimed is:

1. A cationic electrodeposition coating composition comprising amino group-containing modified epoxy resin (A), blocked polyisocyanate curing agent (B), metal compound (C), and nitrogen oxide ion (E);

the cationic electrodeposition coating composition comprising the metal compound (C) in an amount of 10 to 10,000 ppm calculated as metal (on a metal mass basis), and the nitrogen oxide ion (E) in an amount of 50 to 10,000 ppm, relative to the mass of the cationic electrodeposition coating composition, the amino group-containing modified epoxy resin (A) being a resin obtained by reacting modified epoxy resin (A1) having an epoxy equivalent of 500 to 2,500 and amine compound (A2), the modified epoxy resin (A1) being obtained by reacting diepoxy compound (a1), epoxy resin (a2) having an epoxy equivalent of 170 to 500, and bisphenol compound (a3), the diepoxy compound (a1) being compound (1) represented by Formula (1) below,

[Chem. 1]

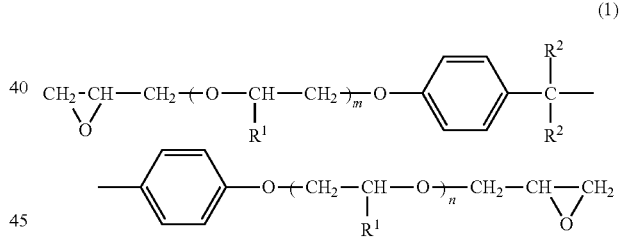
(1)

wherein $R^1$ is the same or different, and each represents a hydrogen atom or a $C_{1-6}$ alkyl group;
$R^2$ is the same or different, and each represents a hydrogen atom or $C_{1-2}$ alkyl group, and m and n, which represent the number of repeating units of the portion having an alkylene oxide structure, are integers where m+n=1 to 20, and/or compound (2) represented by Formula (2) below,

[Chem. 2]

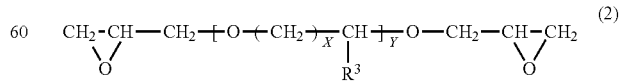
(2)

wherein $R^3$ represents a hydrogen atom or $C_{1-6}$ alkyl group, X is an integer of 1 to 9, and Y is an integer of 1 to 50; when Y is 2 or more, each $R^3$ in the repeating unit is the same or different, and the metal compound (C) being a compound of at least one metal (c) selected from the group consisting of zirconium, titanium, cobalt, vanadium, tungsten, molybdenum, copper, indium, zinc, aluminum, bismuth, yttrium, lanthanoid metals, alkali metals, and alkaline earth metals.

2. The cationic electrodeposition coating composition according to claim 1, wherein the metal compound (C) consists of a zirconium compound, or comprises at least one compound selected from the group consisting of zirconium compounds and titanium compounds, and a compound of at least one metal selected from the group consisting of cobalt, vanadium, tungsten, molybdenum, copper, indium, zinc, aluminum, bismuth, yttrium, lanthanoid metals, alkali metals, and alkaline earth metals.

3. The cationic electrodeposition coating composition according to claim 1, wherein the solids content of the cationic electrodeposition coating composition is 5 to 40 mass%.

4. A coated article obtained by using the cationic electrodeposition coating composition according to claim 1 as an electrodeposition coating composition bath, immersing a metal substrate therein, and performing electrodeposition coating.

5. A coated article obtained by using the cationic electrodeposition coating composition according to claim 2 as an electrodeposition coating composition bath, immersing a metal substrate therein, and performing electrodeposition coating.

6. A coated article obtained by using the cationic electrodeposition coating composition according to claim 3 as an electrodeposition coating composition bath, immersing a metal substrate therein, and performing electrodeposition coating.

* * * * *